Figure 1:
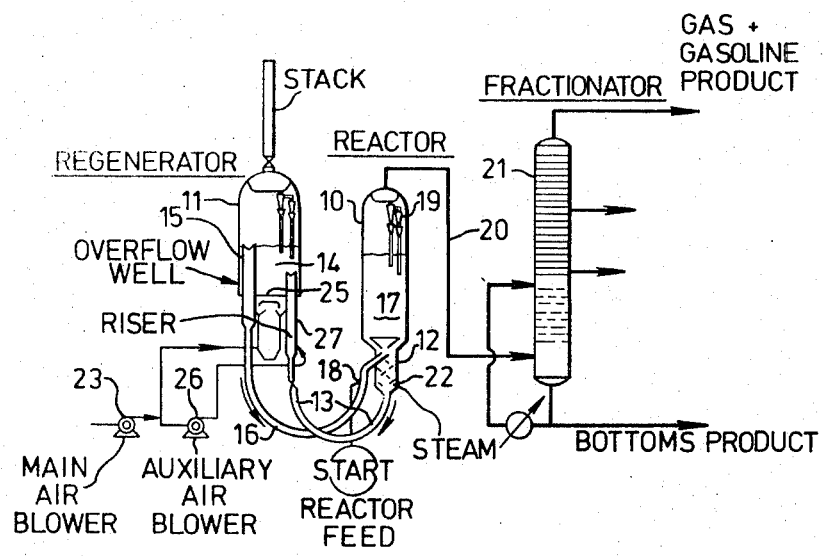

United States Patent [19]

Jenkinson

[11] 3,849,899
[45] Nov. 26, 1974

[54] REGULATING FLUIDIZED BEDS

[75] Inventor: Ronald James Jenkinson, Weybridge, England

[73] Assignee: Exxon Research and Engineering Company, Linden, N.J.

[22] Filed: Apr. 27, 1973

[21] Appl. No.: 354,944

[30] Foreign Application Priority Data
May 5, 1972   Great Britain .................... 21009/72

[52] U.S. Cl. .......................... 34/10, 34/57R, 432/15, 432/58, 23/288 S
[51] Int. Cl. ............................................. F26b 3/08
[58] Field of Search ...... 34/10, 57 R, 57 A; 432/15, 432/58; 165/104; 208/163, 164; 23/288 S

[56] References Cited
UNITED STATES PATENTS

| | | | |
|---|---|---|---|
| 2,586,818 | 2/1952 | Harms | 23/288 S X |
| 3,166,385 | 1/1965 | Pahlavouni | 34/57 A |
| 3,401,465 | 9/1968 | Larwill | 34/57 A |
| 3,648,380 | 3/1972 | Guilloud | 34/57 A X |

*Primary Examiner*—William F. O'Dea
*Assistant Examiner*—William C. Anderson
*Attorney, Agent, or Firm*—J. E. Luecke; J. W. Ditsler

[57] ABSTRACT

The weight of particles in a fluidized bed is regulated substantially independently of the volume of the bed, and hence independently of the flow of fluidizing medium, employing a weir system for removing particles from the bed, the weir system comprising an underflow weir, the lip of which is preferably just above the bottom of the fluidized bed, and a laterally spaced overflow weir, the particles being disengaged from fluidizing medium on passing under the underflow weir and packing in the space between the two weirs to an apparent density which depends on the bed weight. The rate of particle overflow from the overflow weir can be regulated by injecting a fluidizing gas or vapour between the weirs, preferably near the bottom of the space between the weirs.

15 Claims, 2 Drawing Figures

REGULATING FLUIDIZED BEDS

The present invention relates to regulating the weight of particulate solids in a fluidized bed contacting zone for particulate solids and a fluid which fluidizes the particulate solids.

Particulate solids are fluidized in beds by fluids (usually gases and/or vapours) in such operations as cracking of hydrocarbons, hydroforming, coking and metal ore reduction processes.

The amount of particulate solid in the contacting zone has, in general, previously been regulated by the use of overflow weirs at the sides of the contacting zone. When the expanded bed of fluidized solids reaches the level of the lip of such an overflow weir, the solids spill over the lip into a solids collection zone while the fluid passes upwards out of the contacting zone. A problem arising from this simple manner of regulating the amount of solids in the contacting zone is that the transfer of solids out of the contacting zone depends on the volume of the fluidized solids bed which is fixed by the height of the weir lip. The volume of the bed depends very largely on the amount of fluid passing through the bed, and in consequence, if there should be any variation in the fluid supply rate through the bed, the weight of solid in the bed, and its residence time in the bed will vary also.

The present invention is intended to obviate or mitigate the problem outlined above, and in accordance with this invention the fluid/solids contacting zone is defined in part by a weir system comprising an underflow weir having its lip preferably spaced from a bottom portion of the contacting zone, and defining on one side at least part of a wall of the contacting zone, an overflow weir spaced from the underflow weir, one side of the overflow weir defining with the other side of the underflow weir an exit path for solids, and the other side of the overflow weir defining at least part of the solids receiving zone or of a duct leading to the solids receiving zone.

The weir system of the invention enables solids to pack in the space between the underflow and overflow weirs to a level and an apparent density which substantially depends on the actual weight inventory of solids in the contacting zone and their packing density rather than on the volume of the expanded bed in the contacting zone, since the solids substantially disengage from the fluid and become substantially defluidized from the fluid in the contacting zone as they pass under the lip of the underflow weir between the latter and the adjacent bottom portion of the contacting zone.

The said bottom portion of the contacting zone may be, in fact, that part of the base of the vessel containing the contacting zone which is located beneath the lip of the underflow weir, or it may be a baffle spaced beneath the lip of the underflow weir: if such a baffle is employed, it may slope upwardly into the contacting zone for a short distance to promote disengagement between solids and the fluidizing fluid in the vicinity of the underflow weir.

Control of the flow of solids under the underflow weir and/or over the overflow weir may be enhanced by forming the lip of one or both of these weirs with a castellated edge, or slots in the wall near the edge.

Although solids will tend to transfer from the fluidized bed contacting zone to the solids receiving zone (or duct thereto) in the absence of any further means for promoting such transfer, and at a rate which is substantially independent of the fluid supply rate to the contacting zone, it is preferred to provide means for promoting such transfer by supplying a gas and/or vapours to the space between the two weirs. The supply of gas and/or vapour is preferably to the bottom region of the space between the weirs, and the rate of supply may be adjusted either to promote relatively uniform solids transfer or to vary the rate of transfer by varying the rate of gas or vapour supply.

The invention in other aspects, comprises, apparatus and/or plant including the constructions as hereinbefore described, and methods of operating fluid/solid contacting zones and apparatus or plant utilizing such zones employing the foregoing constructions.

Figure 2:
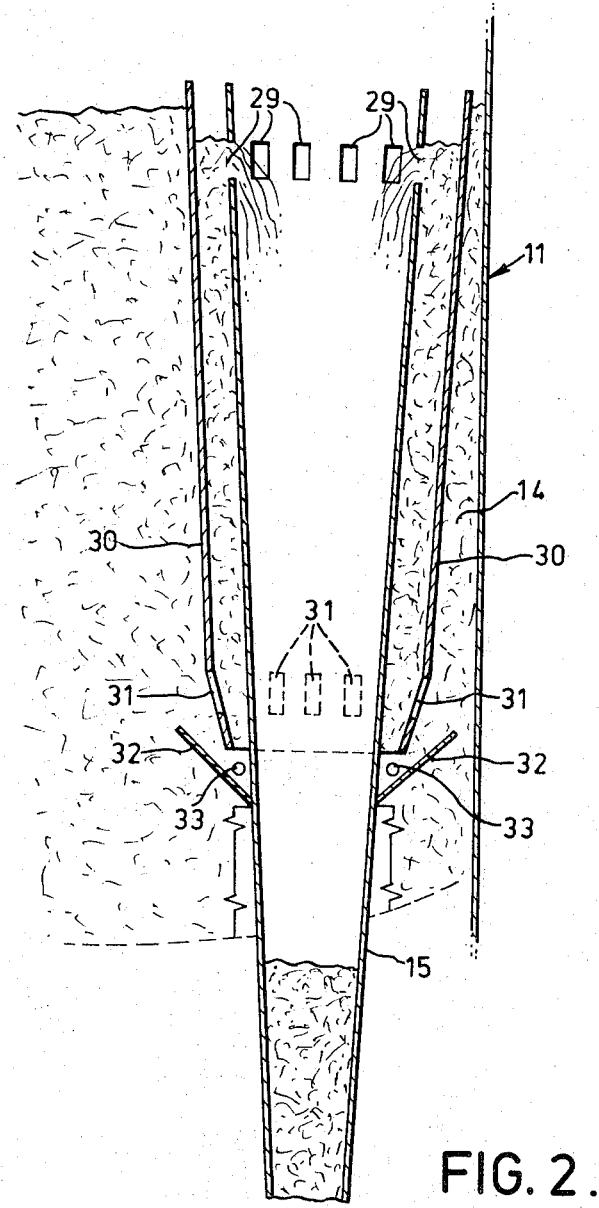

The invention will now be described by way of a non-limitative example thereof and with reference to the accompanying drawings in which:

FIG. 1 is a flow diagram of a fluid catalytic cracking plant for the conversion of hydrocarbon feedstocks, and FIG. 2 shows, in an enlarged view, a part of FIG. 1 in accordance with the invention.

Referring first to FIG. 1, there is shown a reactor 10, a catalyst regenerator 11, a smoothly curved U-shape conduit 13 extending from the base 12 of the reactor 10 for transferring coked catalyst solids from the reactor 10 to a bed 14 in the regenerator 11, an overflow well 15 in the regenerator bed 14 into which regenerated catalyst solids overflow from the bed 14, and a smoothly curved U-shaped transfer conduit 16 through which regenerated solids from the well 15 are transferred to a fluidized bed 17 in the reactor 10, above the base 12 thereof.

The hydrocarbon feedstock 15 is passed into the conduit 16 at point 18 and passes co-currently with regenerated catalyst solids into the reactor bed 17. The regenerated solids are hot from the regeneration process and cause conversion of the hydrocarbons to lighter products which leave in the vapour phase via cyclones and a product line 20, from which they are passed to a fractionation column 21 for separation in the conventional manner into streams of different boiling ranges.

During the conversion in the reactor bed 17, coke solids are deposited on the catalyst solids. The catalyst solids circulate downwards to the base section 12 of the reactor where they are stripped of vapourizable hydrocarbon material by high pressure steam injected at 22.

In the regenerator, the coked catalyst solids are fluidized in air: this causes removal of the coke deposit with a corresponding elevation of the catalyst solids temperature. The air is supplied from a main air blower 23, and most of this air is passed via line 24 directly to the base of the regenerator 11 for distribution into the bed 14 by means of a distributor 25. The remaining part of the air is raised to a higher pressure by passage through an auxillary blower 26 from where it is passed into a riser 27 at the regenerator end of the conduit 13 to promote the flow of solids from the base 12 of the reactor 10 into the regenerator bed 14.

The fluidized solids in regenerator bed 14 are largely free of coke by the time they flow into the overflow well 15 for re-use in the reactor 10.

In FIG. 2, an overflow well 15 in accordance with this invention is shown. The overflow well 15 acts as a collection or receiving zone for solids which have been regenerated in the surrounding fluidized bed 14 of the regenerator 11.

The top region of the overflow well is provided with a number of peripherally spaced slots 29 which act as overflow weirs: if the level of solids behind the slots 29 rises, a greater area of each slot is available for flow of solids, and the provision of the slots 29 prevents any substantial change in the solids level outside the overflow well 15, whilst providing advantages in ease and strength of construction of the overflow well pipe 15. Surrounding the overflow well pipe 15 within the regenerator vessel 11 is a baffle 30 which is provided with peripherally spaced slots 31 at its bottom region which serve as underflow weirs. The baffle 30 is spaced from the bottom of the regenerator bed 14, and below the bottom of the baffle 30 and spaced apart therefrom is a frusto-conical baffle 32 which extends upwardly from the interior wall of the overflow well pipe 15 a short distance past the bottom of the baffle 30 into the regenerator bed 14.

Beneath the annulus defined between the well pipe 15 and the baffle 30 is provided a sparging tube 33 having perforated walls through which perforations a gas or vapour (such as air and/or steam) can be passed to maintain a desired degree of fluidization of solids which accumulate in the annulus, thereby to prevent slumping and sticking of the solids in the annulus. The sparging tube 30 is connected to a source of gas or vapour, and although it is depicted in a position beneath the aforesaid annulus, it may instead be located within the annulus: however, it is preferred that the sparging gas or vapour should be provided as low down as possible relative to regions where potential packing of solids can occur.

In operation of the regenerator 11, solid particles fluidized in air tend to disengage from the air in regions above the baffle 32 and to sink to the base of the annulus between the baffle 30 and the well pipe 15, either by passing through the slots 31 or between the baffle 32 and the lower lip of the baffle 30. The particles pile up and fill the annulus until the level of the slots 29 is reached, whereupon particles will overflow from the annulus at a rate which depends on the difference in static head between the top of the fluidized bed 14 and the top of the particles in the annulus at the overflow level of the slots 29. This difference in static head is substantially equal to the difference in static heads due to the particles only, and is substantially independent of the air flow rate in the bed 14: thus, referring to FIG. 1, if the feedstock injected at 18 is of a type which deposits an excessive or diminished (i.e., abnormal) amount of carbon on the particles during conversion in the reactor bed 17, the rate of circulation of particles to the regenerator bed 14 will need to be varied to maintain a desired degree of cracking intensity in the reactor. Correspondingly, the rate of air supply to the regenerator 11 will need to be varied to remove the abnormal amounts of carbon from the particles. Such variation in the air supply rate changes the apparent density in the regenerator bed 14, which is of substantially fixed volume, and if the exit from the regenerator bed 14 to the overflow well 15 were simply an overflow weir, changes in air flow rate in the regenerator bed 14 would cause variations in the overflow of solids from the bed 14 to the overflow well 15.

In contrast to the foregoing, it is clear that by means of the construction described so far in relation to FIG. 2, the rate of exit of solids from the regenerator bed 14 to the overflow well 15 is dictated substantially only by the weight of solids in the bed 14. Thus, any desired cracking intensity can be maintained in the reactor 10 by a desired rate of circulation of catalyst particles between the reactor 10 and the regenerator 11 and with an appropriate air flow rate in the regenerator bed 14, the rate of catalyst particles circulation rate being substantially unaffected by the air flow rate in the regenerator 11.

Referring now to FIG. 2, if it is desired to increase the rate of solids flow out of the annulus between the baffle 30 and the overflow well pipe 15, and also, if it is desired to avoid sticking or slumping of packed particles in the annulus, a gas or vapour, preferably steam, is discharged from the sparging tube 33 to cause a degree of fluidization of the particles in the annulus. As the rate of steam discharge is increased, the rate of particle outflow from the annulus to the overflow pipe 15 is increased, and the rate of steam supply to the sparging tube can be used to regulate the rate of solids overflow to pipe 15. It will be appreciated that the change of flow-rate of solids during the gas/vapour discharge from the sparging tube 33 will be temporary, as the amount of particles in the regenerator bed 14 will only continue to change until the inflow to, and outflow from, the bed 14 again become equal. Thus the rate of steam discharge into the annulus provides a means of regulating the weight inventory of particles in the regenerator bed 14.

Although the invention has been particularly described in relation to catalytic cracking, it will be appreciated that it can be applied in any field of technology where particulate solids/fluid contact is employed.

I claim:

1. A method of regulating the weight of particulate solids in a fluidized bed contacting zone into which particulate solids are passed for fluidization by a fluidizing fluid and out of which particulate solids pass, the method comprising substantially disengaging particulate solids leaving the contacting zone from fluidizing fluid by passing the existing solids under the lip of an underflow weir, which underflow weir provides at least part of a containing wall of the contacting zone, into a space defined by the underflow weir and an overflow weir which is laterally separated from the underflow weir, whereby the solids pack in said space to an apparent density which is substantially independent of the degree of fluidization in the contacting zone, and causing the solids to pass over the overflow weir.

2. A method according to claim 1 in which said disengagement of said solids and fluids is promoted by spacing the lip of the underflow weir above a bottom portion of the contacting zone.

3. A method according to claim 2 in which the bottom portion of the contacting zone is provided by a baffle which extends into the contacting zone at least from beneath the underflow weir.

4. A method according to claim 3 in which said solids/fluid disengagement is promoted by so arranging the baffle that the baffle slopes upwardly into the contacting zone.

5. A method according to claim 4 in which a fluid selected from the group consisting of gases, vapors, and mixtures thereof is supplied at selected rates to said space between the weirs whereby the rate of transfer of solids out of the contacting zone is varied in a predetermined manner.

6. A method according to claim 1 in which a fluid selected from the group consisting of gases, vapors, and mixtures thereof is supplied at selected rates to said space between the weirs whereby the rate of transfer of solids out of the contacting zone is varied in a predetermined manner.

7. A method according to claim 6 in which said fluid is supplied to a bottom region of said space.

8. A fluidized bed system comprising a vessel for containing a fluidized bed contacting zone in which, during operation, particulate solids are fluidized by a fluidizing fluid passing through said zone, an inlet to the zone for particulate solids, and a weir means defining part of the contacting zone and for promoting substantial disengagement of fluidizing fluid and solids leaving the contacting zone, said weir means comprising an underflow weir which provides at least part of a containing wall of the contacting zone, and an overflow weir laterally separated from the underflow weir to define with the underflow weir an exit path for solids leaving the contacting zone.

9. A system according to claim 8 in which the lip of the underflow weir is located above a bottom portion of the contacting zone.

10. A system according to claim 9 in which the said bottom portion of the contacting zone is provided by a baffle which extends into the contacting zone at least from beneath the underflow weir.

11. A system according to claim 10 in which the said baffle slopes upwardly into the contacting zone away from the weir means.

12. A system according to claim 8 in which at least one weir of the weir means has a castillated lip.

13. A system according to claim 8 in which at least one weir of the weir means has slots formed therein adjacent to the lip thereof.

14. A system according to claim 8 comprising means for supplying a fluid selected from the group consisting of gases, vapors and mixtures thereof to the space between the weirs for regulating the rate of transfer solids out of the contacting zone in a predetermined manner.

15. A system according to claim 14 in which said fluid supply means is arranged for supplying said fluid to a bottom zone of said space.

* * * * *